US008559712B2

(12) United States Patent
Dalton et al.

(10) Patent No.: US 8,559,712 B2
(45) Date of Patent: Oct. 15, 2013

(54) PROCESSING AN IMAGE OF A PERSON'S FACE

(75) Inventors: Dan L. Dalton, Greeley, CO (US); Daniel Bloom, Loveland, CO (US); David Staudacher, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 421 days.

(21) Appl. No.: 12/880,524

(22) Filed: Sep. 13, 2010

(65) Prior Publication Data

US 2012/0063648 A1  Mar. 15, 2012

(51) Int. Cl.
G06K 9/00 (2006.01)
G06K 9/40 (2006.01)

(52) U.S. Cl.
USPC ............ 382/167; 382/103; 382/274

(58) Field of Classification Search
USPC ................. 382/103, 162, 167, 274
See application file for complete search history.

(56) References Cited

U.S. PATENT DOCUMENTS 7,116,820 B2 * 10/2006 Luo et al. ............... 382/167
2010/0026831 A1   2/2010 Ciuc et al.

FOREIGN PATENT DOCUMENTS

KR   20050019599 A1   3/2005
TW   200729083 A1   1/2006
WO   WO 2009/096987 A1 *  8/2009 ............ G06T 11/60

OTHER PUBLICATIONS

Oravec, M.—"Extraction of Facial Features from Color Images"—RadioEngineering—Sep. 2008, vol. 17, No. 3, pp. 115-120.*
Hsu, R.L.—"Face Detection in Color Images"—IEEE 2002, vol. 24, No. 5, pp. 696-706.*
Brakel, R.B.J.—"Eye Tracking—Additional component computer graphics"—Jan. 2008, pp. 1-18.*
Xiaozheng Jane Zhang et al., "Finding Lips in Unconstrained Imagery for Improved Automatic Speech Recognition", Visual 2007, LNCS 4781,2007, pp. 185-192.
Cheng-Chin Chiang et al., "A Novel Method for Detecting Lips, Eyes and Faces in Real Time", Real-Time Imaging 9, Elsevier Ltd., 2003, pp. 277-287.
Stew Wen Chin et al., "New Lips Detection and Tracking System", Proceedings of the International MultiConference of Engineers and Computer Scientists 2009 vol. I, IMECS 2009, Mar. 18-20, 2009, Hong Kong, 6 pages.

* cited by examiner

*Primary Examiner* — Bernard Krasnic

(57) ABSTRACT

An image contains a representation of a person's face, where the image has plural points each comprising multiple components of a color space. For each of the plural points, at least two of the color space components are combined to produce a respective aggregate value. The image is processed to convert at least some of the points of the image based on the calculated aggregate values.

8 Claims, 4 Drawing Sheets

PROCESSING AN IMAGE OF A PERSON'S FACE

BACKGROUND

Face detection techniques can be used for various purposes, such as for security (for controlling access of individuals to a secured site such as a physical site or an online network site), for finding faces in pictures, and so forth. However, typical face detection techniques may not be able to effectively identify certain features of a person's face.

BRIEF DESCRIPTION OF THE DRAWINGS

Some embodiments are described with respect to the following figures.

DETAILED DESCRIPTION

Typical face detection techniques can locate a person's face within an image, but such face detection techniques may not be able to effectively or efficiently locate certain features (e.g., mouth or lips) on the face. Usually, it can be difficult to distinguish the lips (or mouth) from the surrounding skin. Additionally, if facial hair is present, locating the lips or mouth on the face can be even more challenging.

In accordance with some embodiments, techniques or mechanisms are provided to process an image containing a representation of a person's face to allow for more effective or efficient locating of target features (e.g., lips or mouth) on the face in the image. The image is processed to enhance the target features such that the target features can be more easily located on the face in the image.

Figure 1:
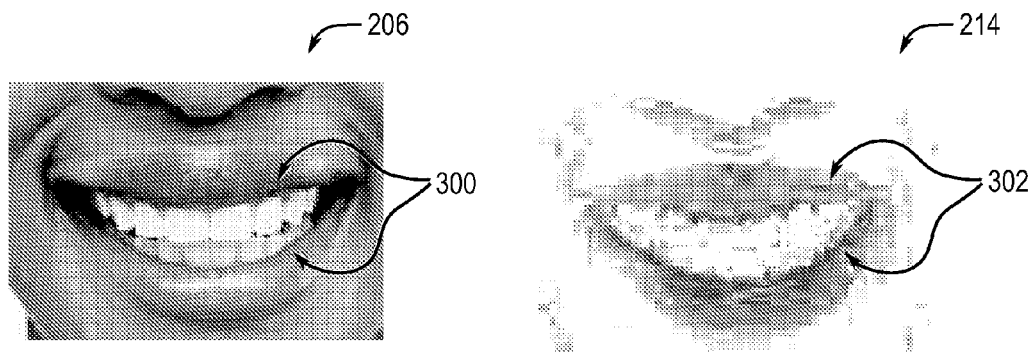
FIG. 1 is a flow diagram of a process according to some implementations.

FIG. 1 is a flow diagram of a process according to some implementations, which can be performed by a system having a processor, for example. The process of FIG. 1 receives (at 102) an image that contains a representation of a person's face. The image contains plural pixels each having multiple components of a particular color space. In some examples, the color space for the image is the YCbCr space, where Y represents the luminance component, Cb represents the blue-difference chroma component, and Cr represents the red-difference chroma component. Cb is blue minus the luminance (B–Y), while Cr is red minus luminance (C–Y). In other examples, the image containing the representation of a person's face can be represented in a different color space, such as the RGB (red, green, blue) color space, CMYK (cyan, magenta, yellow, key), or other color space.

In the ensuing discussion, reference is made to the YCbCr space. However, other implementations can use images in other color spaces.

The process of FIG. 1 calculates (at 104) an aggregate of at least two color space components (e.g., the Cb and Cr components) for each pixel to produce a corresponding aggregate value. In some examples, the aggregation of the Cb and Cr components of each pixel is based on a product (multiplication) of the Cb and Cr components (Cb·Cr). Other examples of aggregates include (255−Cb)·(255−Cr), or (Cb·(255−Cr)), or ((Cb−255)·Cr), etc. Selection of different aggregates of color components allows for enhancement of different features of the face. Based on the aggregate values of the pixels of the image, the image can be processed (at 106) to convert at least some of the pixels of the image, to form a converted image that highlights a target feature of the face. Highlighting a target feature of a face represented by an image refers to making the target feature more visible than a region of the face surrounding the target feature, such that a face detection technique can more easily detect the target feature.

Although reference is made (at 104) to calculating aggregate values of pixels of the image, it is noted that aggregate values can more generally be calculated for respective points in the image. A "point" in the image can refer to a single pixel in the image, or alternatively, can refer to a group of pixels in the image. In such implementations, the conversion of the image (performed at 106) can involve conversion of at least some "points" of the image.

Figure 2:
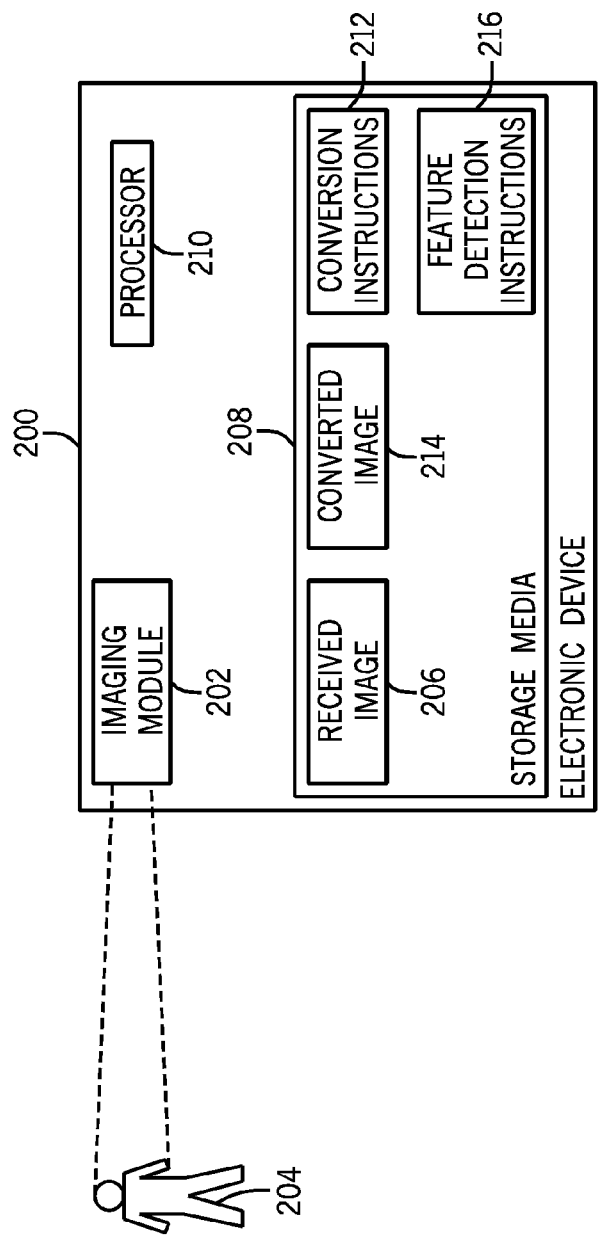
FIG. 2 is a block diagram of an example electronic device according to some implementations.

FIG. 2 is a block diagram of an electronic device 200 that incorporates some implementations. The electronic device 200 can be a computer, a personal digital assistant (PDA), a digital camera, a mobile telephone, or another type of electronic device.

In some examples, the electronic device 200 includes an imaging module 202 to capture an image of a person (or a portion of the person) 204. For example, the imaging module 202 can be used to capture an image containing the face of the person 204. The image containing the person's face is stored as received image 206 (see also FIG. 3A) in storage media 208 of the electronic device 200. The storage media 208 can include a volatile memory device (such as a dynamic random access memory device or static random access memory device) and/or a persistent storage device (e.g., disk-based storage device or flash memory).

In other implementations, the electronic device 200 can be provided without an imaging module 202. In such implementations, the received image 206 containing a representation of a person's face is captured by a different device and communicated to the electronic device 200, such as over a network or through a port of the electronic device 200.

The electronic device 200 includes a processor 210 (or multiple processors). In addition, conversion instructions 212 are stored in the storage media 208. The conversion instructions 212 are executable on the processor(s) 210 to perform tasks according to some implementations, such as at least some of the tasks of FIG. 1. The conversion instructions 212 are capable of calculating the aggregates of color space components (e.g., based on products of Cb and Cr components) for pixels of the received image 206, as discussed above. The conversion instructions 212 are able to process the image based on the calculated aggregate values to produce a converted image 214 (see also FIG. 3B) or converted image 214' (see also FIG. 3C) that highlights target features of the person's face, such as the lips or mouth of the face.

The storage media 208 can also store feature detection instructions 216, which are executable on the processor(s) 210. The feature detection instructions 216 can be used to locate a target feature of a person's face as represented in the converted image 214. In alternative examples, the feature detection instructions 216 can be provided on a device that is separate from the electronic device 200.

Figures 3A, 3B:
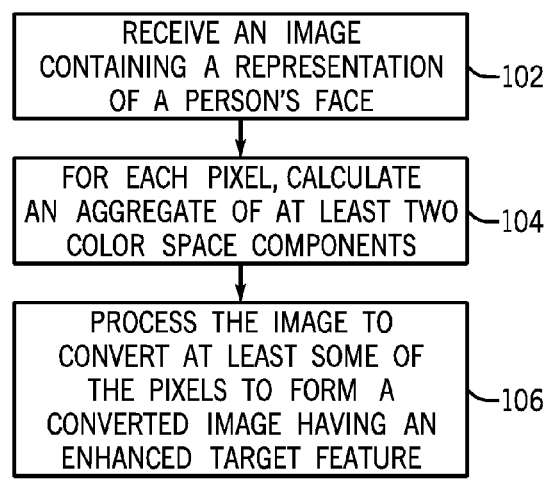
FIGS. 3A-3C depict an initial image and converted images, respectively, containing a representation of a person's face, which can be processed according to some implementations.

FIG. 3A illustrates an example of the received image 206 that contains a portion of a person's face. As depicted in FIG.

Figure 3C:
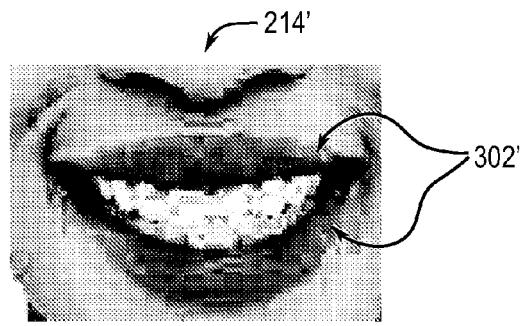

3A, the lips 300 (target feature) are not very distinguishable from the surrounding skin. After processing according to some implementations, the converted image 214 of FIG. 3B is produced, in which the pixels corresponding to the lips 302 are darker than the surrounding pixels, which correspond to the skin of the face. Consequently, it is easier to locate the lips 302 in the converted image 214, than in a normal image prior to processing performed according to some implementations. FIG. 3C depicts a further converted image 214' with enhanced lips 302' (discussed further below).

Figure 4:
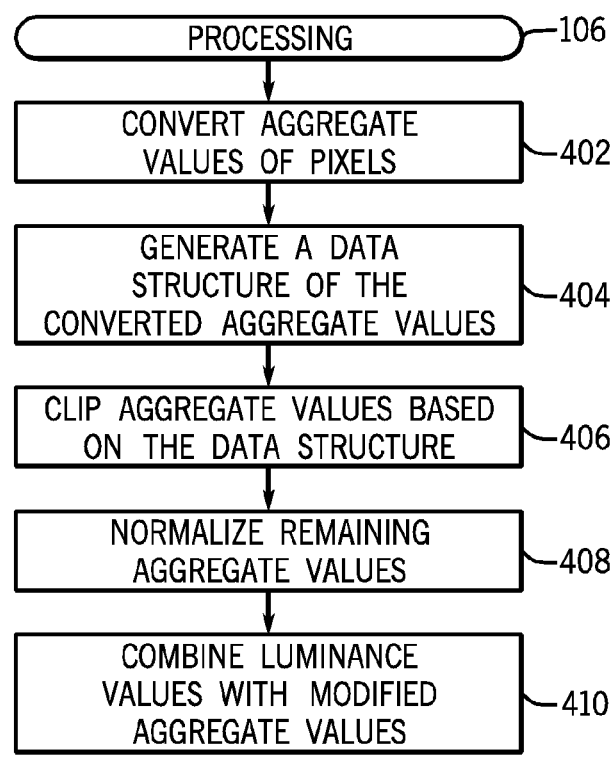
FIG. 4 is a flow diagram of a process of producing a converted image, in accordance with some implementations.

FIG. 4 depicts some implementations of the processing of the image based on the aggregate values, as performed (at 106) in FIG. 1. The process of FIG. 4 can also be performed by the conversion instructions 212 in FIG. 2.

The aggregate values (based on the product of Cb and Cr) are first converted (at 402) to effectively perform inversion on Cb·Cr values (such that the inverted values can be more easily combined with Y (luminance) values in some implementations. The aggregate values based on the product of Cb and Cr components are calculated as follows:

$$[(Cb[i] \cdot Cr[i]) - (104 \cdot 104)] >> 6,$$

where i represents a particular pixel, and the ">>6" operation shifts the value of CbCr to the right by 6 bits, which is effectively a division by 64. Also, the subtraction of 104·104 from Cb[i]·Cr[i] is based on the observation that the value of (Cb[i]·Cr[i])/256 for pixels corresponding to the lips are typically in the range of 104 to 168. Subtracting 104·104 from Cb[i]·Cr[i] and dividing by 64 instead of 256 can add further color depth than can be represented by (Cb[i]·Cr[i])/256. These formulas assume that Cb and Cr are 8-bit values. The formulas would be adjusted if Cb and Cr are other than 8-bit values.

In other examples, other values can be used aside from 104·104 and 6. More generally, the aggregate values for each pixel i can be calculated as (Cb[i]·Cr[i]−M)/n, where M represents a value to subtract from the product of Cb and Cr, and n represents the number to divide by.

In some examples, the conversion performed at 402 in FIG. 4 can be as follows:

```
int gray = 255 − { [(Cb[i]·Cr[i]) − (104·104)] >> 6 }
if (gray < 0)
    CbCr[i] = 0;
else if (gray > 255)
    CbCr[i] = 255;
else
    CbCr[i] = gray.
```

As noted above, the foregoing effectively inverts Cb[i]·Cr[i] values to form inverted values CbCr[i], where low CbCr[i] values correspond to the lips and high CbCr[i] correspond to surrounding skin. Such inversion of Cb[i]·Cr[i] values is performed to make it easier (in some examples) to combine with Y (luminance) values of the image, since Y values for the lips are lower and Y values for the surrounding skin are higher.

In other implementations, the conversion of 402 in FIG. 4 can be omitted, such as in implementations where the Cb[i]·Cr[i] values do not have to be converted from 16 bits back to 8 bits and/or the product is not combined with Y values to form the converted image 214 of FIG. 2.

The FIG. 4 process next generates (at 404) a data structure (e.g., a histogram) that provides a representation of numbers of occurrences of respective CbCr[i] values. In the histogram example, multiple buckets are created, where each bucket corresponds to a respective unique CbCr[i] value (or unique range of CbCr[i] values).

In some implementations, "clipping" can be performed (at 406) based on the histogram (or other data structure). "Clipping" refers to setting some predefined percentage (e.g., greater than 50%, 70%, etc.) or number of pixels in the image to a predefined value since such pixels are associated with CbCr[i] values that indicate that the respective pixels represent regions surrounding the target feature. The process of FIG. 4 can go through the histogram and select the predefined percentage or number of pixels in the image to clip—in other words, the process selects the pixels having CbCr[i] values in the buckets of the histogram that correspond to regions of the face that are unlikely to include the target feature. For example, the skin surrounding the lips tends to be lighter, which corresponds to pixels that are associated with relatively high CbCr[i] values. The top 50% (or other predefined percentage) pixels in the high CbCr[i] value range can be clipped by setting the CbCr[i] values to a predefined high value (e.g., 255).

Selecting a predefined percentage or number of pixels in the image to clip effectively corresponds to selecting a threshold in the histogram, where pixels associated with CbCr[i] values on one side of the threshold in the histogram are selected for clipping.

After clipping is performed at 406, the remaining CbCr[i] values are normalized (at 408) from 0 to 255. Normalizing the remaining CbCr[i] values involves taking the reduced range of CbCr[i] values (due to the clipping performed at 406), and adjusting the CbCr[i] values in the reduced range to go from 0 to 255. Note that the clipping and normalizing performed at 406 and 408, respectively, can be based on use of a lookup table, where input CbCr[i] values are provided to the lookup table, and output CbCr[i] values are produced based on the input CbCr[i] values.

After the clipping and normalizing tasks 406 and 408, respectively, the converted image 214 according to some implementations is produced with the modified CbCr[i] values. An example of a converted image 214 with modified (clipped and normalized) CbCr[i] values is represented in FIG. 3B. This converted image 214 with modified CbCr[i] values can be used by the feature detection instructions 216 (FIG. 2) to locate the target feature.

In some implementations, to further enhance the target feature (e.g., lips or mouth) of the face and/or deemphasize pixels surrounding the target feature on the face, the Y (luminance) values can be combined (at 410) with the modified CbCr[i] values to create a different converted image 214', as shown in FIG. 3C. The combining of Y and CbCr[i] values can be as simple as multiplying Y[i] (the luminance value for pixel I) with CbCr[i], to form YCbCr[i]. The converted image 214' after the processing at 410 includes pixels having the respective YCbCr[i] values. Combining Y[i] with CbCr[i] tends to darken the lips (302' in FIG. 3C) even more in the converted image 214', which is useable by the feature detection instructions 216 to locate a target feature on a face in the converted image 214'.

Figure 5A:
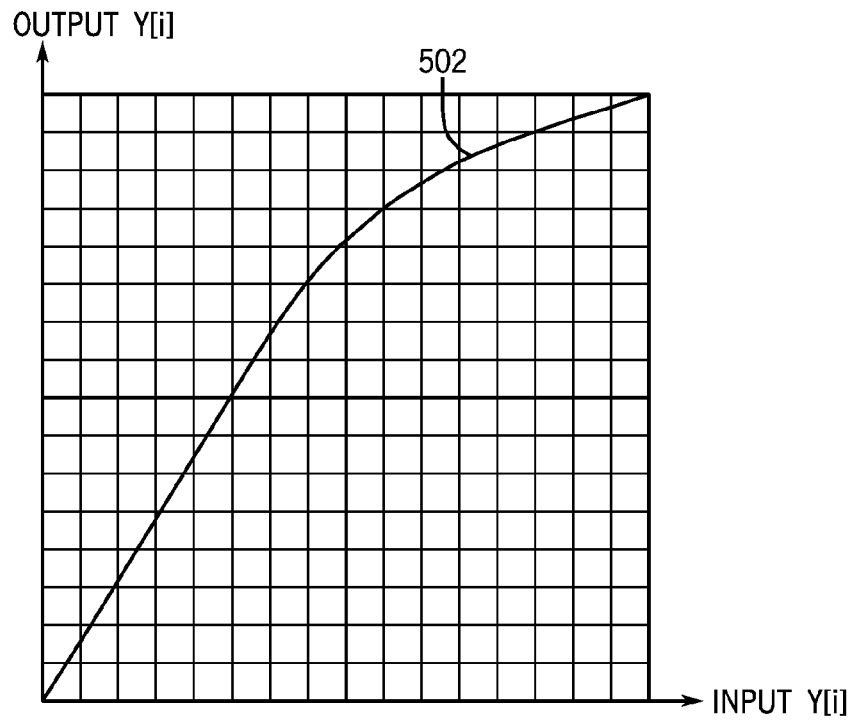
FIGS. 5A-5B are graphs depicting transforms that can be applied to color space components according to some implementations.

In some implementations, prior to combining Y[i] and CbCr[i] values, pre-processing is applied to the Y[i] and CbCr[i] values. The midtones of the Y[i] values can be lightened, such as by applying the transform represented by curve 502 shown in FIG. 5A. In the graph of FIG. 5A, the horizontal axis represents input values (which in this case are input Y[i] values), and the vertical axis represents output values (which in this case represents modified Y[i] values). For each given input Y[i] value, a corresponding point on the curve 502 is identified to provide the output Y[i] value. The curve 502 can be implemented as a lookup table, in some implementations. Alternatively, the curve 502 can be implemented as a formula. The effect of the transform of curve 502 is to lighten the midtones of the Y[i] values.

Figure 5B:
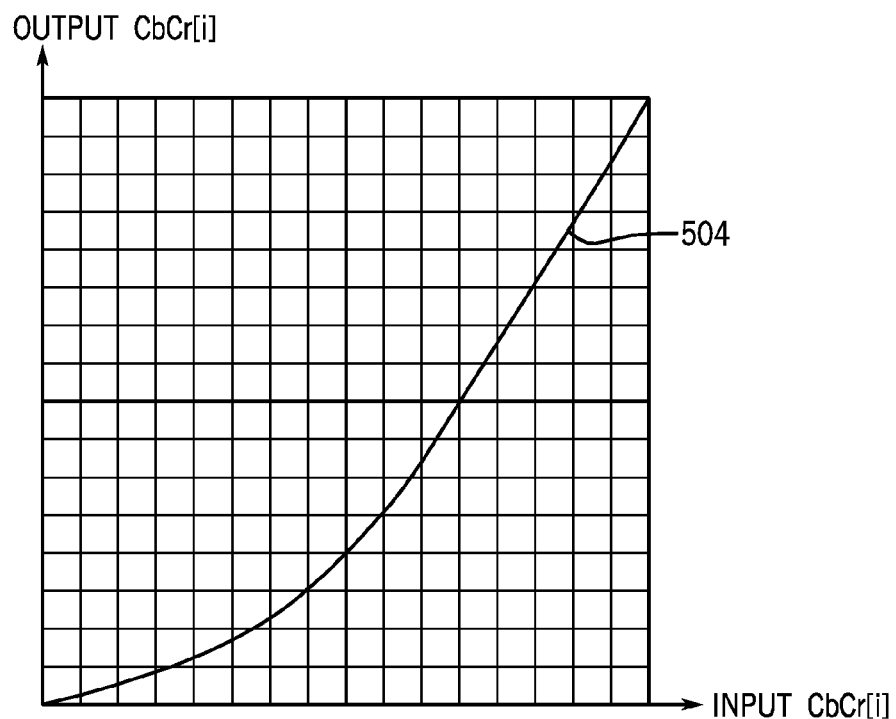

FIG. 5B illustrates a curve 504 that is used to darken the midtones of the CbCr[i] values. The horizontal axis of the graph of FIG. 5B corresponds to input CbCr[i] values, and the vertical axis corresponds to output CbCr[i] values based on the transform represented by curve 504. For a given input CbCr[i] value, a corresponding point on the curve 504 is identified to produce the modified output CbCr[i] value. The curve 504 can be implemented as a lookup table, or as a formula.

In some implementations, instead of the modification of CbCr[i] values in tasks 406, 408, and 410 separately, the clipping, normalizing, and darkening of midtones can be accomplished together by modifying the curve 504 depicted in FIG. 5B.

Machine-readable instructions such as the instructions 212 and 216 of FIG. 2 are loaded for execution on a processor or multiple processors (such as 210 in FIG. 2). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving an image containing a representation of a person's face, where the face has a target feature, wherein the image has points each including a Cb component and a Cr component in a YCbCr space;
for each of the points of the image, combining, by a system having a processor, values of the Cb and Cr components to provide an aggregate value for the corresponding point, wherein combining the values comprises calculating a product based on the Cb and Cr components;
lightening midtones of values of a Y component in the YCbCr space to provide pre-processed values of the Y component;
darkening midtones of the aggregate values derived from calculating the product based on the Cb and Cr components to provide pre-processed aggregate values;
combining the pre-processed values of the Y component with the pre-processed aggregate values; and
producing a converted image based on values for the corresponding points derived from combining the pre-processed values of the Y component and the pre-processed aggregate values.

2. The method of claim 1, wherein producing the converted image comprises producing the converted image that highlights lips or a mouth of the person's face.

3. The method of claim 1, wherein providing the aggregate values for the corresponding points comprises providing the aggregate values for corresponding pixels of the image.

4. An article of manufacture comprising at least one non-transitory machine-readable storage medium storing instructions that upon execution cause a system having a processor to:
receive an image containing a representation of a person's face, where the face has a target feature, wherein the image has points each including a Cb component and a Cr component in a YCbCr space;
for each of the points of the image, combine values of the Cb and Cr components to provide an aggregate value for the corresponding point, wherein combining the values comprises calculating a product based on the Cb and Cr components;
lighten midtones of the values of a Y component in the YCbCr space to provide pre-processed values of the Y component;
darken midtones of the aggregate values derived from calculating the product based on the Cb and Cr components to provide pre-processed aggregate values;
combine the pre-processed values of the Y component with the pre-processed aggregate values; and
produce a converted image based on values for the corresponding points derived from combining the pre-processed values of the Y component and the pre-processed aggregate values.

5. The article of manufacture of claim 4, wherein producing the converted image comprises:
clipping a predefined portion of the points of the image corresponding to regions of the face other than the target feature.

6. The article of manufacture of claim 5, wherein clipping the predefined portion of the points comprises setting the aggregate values for the predefined portion of the points to a predefined value to highlight a difference of the regions from the target feature.

7. An electronic device comprising:
at least one processor; and
machine-readable instructions executable on the at least one processor to:
receive an image containing a representation of a person's face, wherein the image has plural pixels each comprising multiple components of a YCbCr space;
for each of the plural pixels, calculate a product based on a value of the Cb component and a value of the Cr component to produce a respective aggregate value; and
process the image to convert at least some of the pixels of the image based on the calculated aggregate values, to form a converted image that highlights lips or a mouth of the person's face, wherein the converting includes inverting the calculated aggregate values for the at least some of the pixels, wherein processing the image to form the converted image comprises: modifying the aggregate values of a predefined portion of the pixels of the image, the modifying including the inverting; and after the modifying, combining the aggregate values of the pixels of the image with values of a Y component of the YCbCr space associated with the pixels;

pre-processing the aggregate values and the values of the Y component, wherein pre-processing the aggregate values comprises darkening midtones of the aggregate values, and wherein pre-processing the values of the Y component comprises lightening midtones of the values of the Y component, wherein combining the aggregate values and values of the Y component comprises combining the pre-processed aggregate values and the pre-processed values of the Y component.

8. An electronic device comprising:

at least one processor; and machine-readable instructions executable on the at least one processor to:

receive an image containing a representation of a person's face, where the face has a target feature, wherein the image has points each including a Cb component and a Cr component in a YCbCr space;

for each of the points of the image, combine values of the Cb and Cr components to provide an aggregate value for the corresponding point, wherein combining the values comprises calculating a product based on the Cb and Cr components;

lighten midtones of the values of a Y component in the YCbCr space to provide pre-processed values of the Y component;

darken midtones of the aggregate values derived from calculating the product based on the Cb and Cr components to provide pre-processed aggregate values;

combine the pre-processed values of the Y component with the pre-processed aggregate values; and produce a converted image based on values for the corresponding points derived from combining the pre-processed values of the Y component and the pre-processed aggregate values.

\* \* \* \* \*